United States Patent
Vyas et al.

(10) Patent No.: US 12,196,901 B2
(45) Date of Patent: Jan. 14, 2025

(54) METHOD AND APPARATUS FOR PERFORMING DE-ALIASING USING DEEP LEARNING

(71) Applicant: BP Corporation North America Inc., Houston, TX (US)

(72) Inventors: Madhav Vyas, Houston, TX (US); Qingqing Liao, Katy, TX (US)

(73) Assignee: BP CORPORATION NORTH AMERICA INC., Houston, TX (US)

( * ) Notice: Subject to any disclaimer, the term of this patent is extended or adjusted under 35 U.S.C. 154(b) by 420 days.

(21) Appl. No.: 17/620,902

(22) PCT Filed: Jun. 26, 2020

(86) PCT No.: PCT/US2020/039764
§ 371 (c)(1),
(2) Date: Dec. 20, 2021

(87) PCT Pub. No.: WO2021/007045
PCT Pub. Date: Jan. 14, 2021

(65) Prior Publication Data
US 2022/0317322 A1    Oct. 6, 2022

Related U.S. Application Data

(60) Provisional application No. 62/871,491, filed on Jul. 8, 2019.

(51) Int. Cl.
*G01V 1/28* (2006.01)
*G01V 1/36* (2006.01)

(52) U.S. Cl.
CPC ............... *G01V 1/282* (2013.01); *G01V 1/36* (2013.01); *G01V 2210/20* (2013.01); *G01V 2210/70* (2013.01)

(58) Field of Classification Search
CPC ...... G01V 1/282; G01V 1/36; G01V 2210/20; G01V 2210/70
See application file for complete search history.

(56) References Cited

U.S. PATENT DOCUMENTS

| 11,092,710 B2 * | 8/2021 | Hegna ................. G01V 1/38 |
| 11,543,551 B2 * | 1/2023 | Eick .................. G01V 1/302 |

(Continued)

FOREIGN PATENT DOCUMENTS

WO    2018/148492 A1    8/2018

OTHER PUBLICATIONS

Wang et al. (Deep-learning-based seismic data interpolation: A preliminary result, Geophysics, 2019) (Year: 2019).*

(Continued)

*Primary Examiner* — Mohammad K Islam
(74) *Attorney, Agent, or Firm* — CONLEY ROSE, P.C.

(57) ABSTRACT

A method includes receiving modelled seismic data that is to be recognized by the at least one classification and/or segmentation processor. The modelled seismic data can be represented within a transform domain. The method includes generating an output via the at least one processor based on the received modelled seismic data. The method also includes comparing the output of the at least one processor with a desired output. The method also includes modifying the at least one processor so that the output of the processor corresponds to the desired output.

20 Claims, 10 Drawing Sheets

(56) References Cited

U.S. PATENT DOCUMENTS

| | | | | |
|---|---|---|---|---|
| 2016/0320508 | A1* | 11/2016 | Peng | G01V 1/38 |
| 2017/0176614 | A1* | 6/2017 | Alhukail | G01V 1/32 |
| 2017/0192118 | A1 | 7/2017 | Du et al. | |
| 2019/0383965 | A1* | 12/2019 | Salman | G06N 3/08 |

OTHER PUBLICATIONS

Ali et al. (Crossline wavefield reconstruction from multicomponent streamer data: Part 2—Joint interpolation and 3D up/down separation by generalized matching pursuit, 2010) (Year: 2010).*

Mostafa et al. (Beyond alias hierarchical scale curvelet interpolation of regularly and irregularly sampled seismic data, 2010) (Year: 2010).*

Zwartjes et al. (Fourier reconstruction of nonuniformly sampled, aliased seismic data, 2007) (Year: 2007).*

PCT/US2020/039764 International Search Report and Written Opinion dated Oct. 14, 2020 (WO-501386) (17 p.).

Naghizadeh, Mostafa et al., Beyond Alias Hierarchical Scale Curvelet Interpolation of Regularly and Irregularly Sampled Seismic Data, Geophysics, vol. 75, No. 6, Nov. 1, 2010 (WO-501386) (14 p.).

* cited by examiner

METHOD AND APPARATUS FOR PERFORMING DE-ALIASING USING DEEP LEARNING

CROSS-REFERENCE TO RELATED APPLICATIONS

This application is a 35 U.S.C. § 371 U.S. National Stage Entry application of PCT/US2020/039764 filed Jun. 26, 2020, and entitled "Method and Apparatus for Performing De-Aliasing Using Deep Learning," which claims priority to U.S. Provisional patent application No. 62/871,491, filed Jul. 8, 2019 and entitled "Method and Apparatus for Performing De-Aliasing Using Deep Learning," each of which is incorporated herein by reference in its entirety for all purposes.

STATEMENT REGARDING FEDERALLY SPONSORED RESEARCH OR DEVELOPMENT

Not applicable.

BACKGROUND

The present disclosure relates generally to analyzing seismic data, and more specifically, to performing de-aliasing of seismic data by using deep learning.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Seismic data can be data that is collected in the course of performing a seismic survey. A seismic survey includes generating an image or map of a subsurface region of the Earth by sending sound energy down into the ground and recording the reflected sound energy that returns from the geological layers within the subsurface region. During a seismic survey, an energy source is placed at various locations on or above the surface region of the Earth, which may include hydrocarbon deposits. Each time the source is activated, the source generates a seismic (e.g., sound wave) signal that travels downward through the Earth, is reflected, and, upon its return, is recorded using one or more receivers disposed on or above the subsurface region of the Earth. The seismic data recorded by the receivers may then be used to create an image or profile of the corresponding subsurface region.

Upon creation of an image or profile of a subsurface region, these images and/or profiles can be used to interpret characteristics of a formation.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

With one or more embodiments, a method can include receiving modelled seismic data that is to be recognized by at least one classification and/or segmentation processor. The modelled seismic data can be represented within a transform domain. The method can also include generating an output via the at least one classification and/or segmentation processor based on the received modelled seismic data. The method can also include comparing the output of the at least one classification and/or segmentation processor with a desired output. The method can also include modifying the classification and/or segmentation processor so that the output of the classification and/or segmentation processor corresponds to the desired output.

With one or more embodiments, a method can include receiving actual seismic data. The received actual seismic data includes aliasing that is to be identified by at least one trained classification and/or segmentation processor. The received actual seismic data comprises data represented within a transform domain. The method can also include generating an output via the at least one trained classification and/or segmentation processor based on the received actual seismic data. The method can also include generating a mask based on the output. The method can also include removing aliasing from the received actual seismic data using the generated mask. With one or more embodiments, the at least one trained classification and/or segmentation processor can be trained on modelled data. After the at least one trained classification and/or segmentation processor is trained on modelled data, the trained classification and/or segmentation processor can then receive actual seismic data in order to address aliasing that is present within the actual seismic data. With other embodiments, the at least one trained classification and/or segmentation processor can be trained on actual seismic data and/or a combination of actual seismic data and modelled seismic data.

In view of the above, one or more embodiments of the present invention are directed to performing de-aliasing. One or more embodiments can perform de-aliasing by implementing deep learning with classification and/or segmentation processors.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
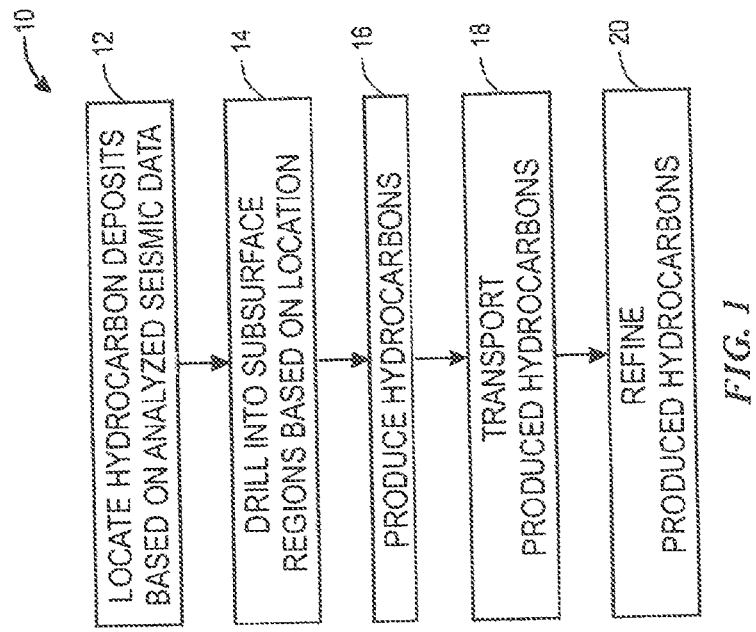
FIG. 1 illustrates a flow chart of various processes that may be performed based on analysis of seismic data acquired via a seismic survey system.
Figure 2:
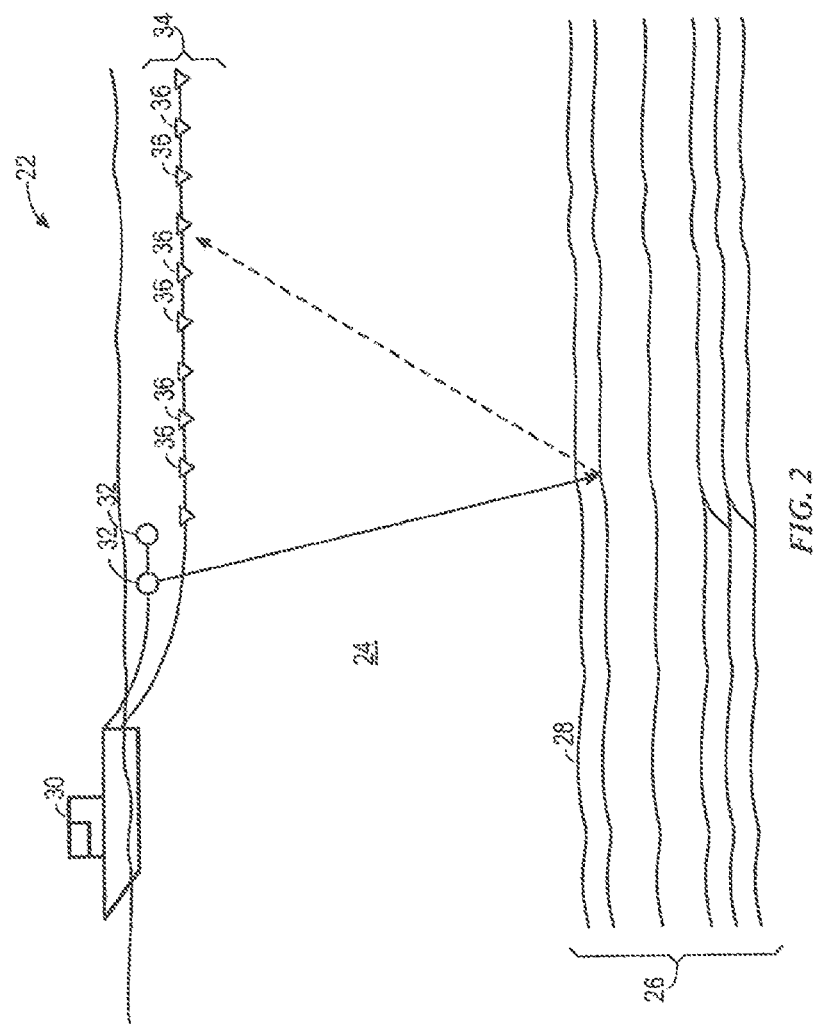
FIG. 2 illustrates a marine survey system in a marine environment.
Figure 3:
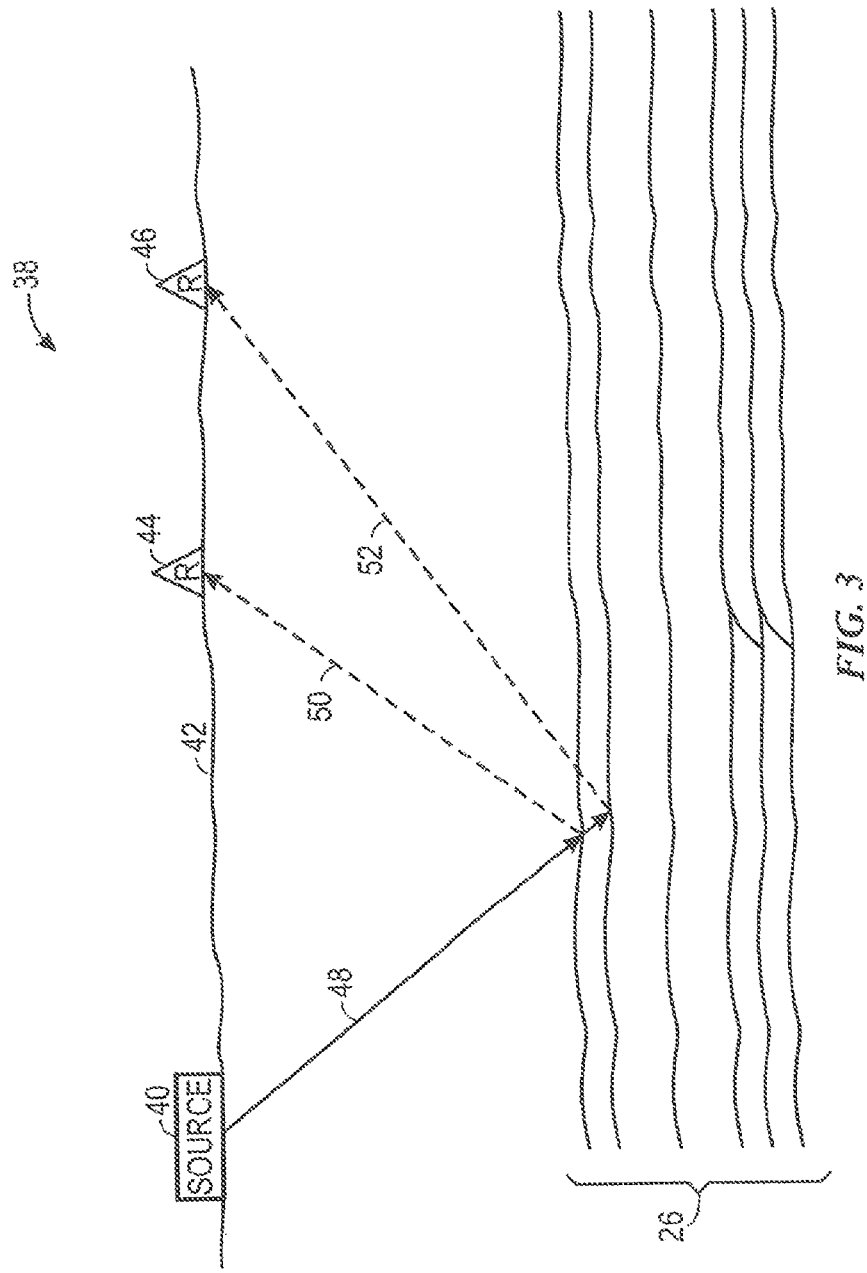
FIG. 3 illustrates a land survey system in a land environment.

By way of introduction, seismic data may be acquired in the course of implementing a variety of seismic survey systems and techniques, two of which are discussed with respect to FIG. 2 and FIG. 3. Regardless of the seismic data gathering technique utilized, after the seismic data is acquired, a computing system may analyze the acquired seismic data and may use the results of the seismic data analysis (e.g., seismogram, map of geological formations, etc.) to perform various operations within the hydrocarbon exploration and production industries. For instance, FIG. 1 illustrates a flow chart of a method 10 that details various processes that may be undertaken based on the analysis of the acquired seismic data. Although the method 10 is described in a particular order, it should be noted that the method 10 may be performed in any suitable order.

Referring now to FIG. 1, at block 12, locations and properties of hydrocarbon deposits within a subsurface region of the Earth associated with the respective seismic survey may be determined based on the analyzed seismic data. In one embodiment, the seismic data acquired may be analyzed to generate a map or profile that illustrates various geological formations within the subsurface region. Based on the identified locations and properties of the hydrocarbon deposits, at block 14, certain positions or parts of the subsurface region may be explored. That is, hydrocarbon exploration organizations may use the locations of the hydrocarbon deposits to determine locations at the surface of the subsurface region to drill into the Earth. As such, the hydrocarbon exploration organizations may use the locations and properties of the hydrocarbon deposits and the associated overburdens to determine a path along which to drill into the Earth, how to drill into the Earth, and the like.

After exploration equipment has been placed within the subsurface region, at block 16, the hydrocarbons that are stored in the hydrocarbon deposits may be produced via natural flowing wells, artificial lift wells, and the like. At block 18, the produced hydrocarbons may be transported to refineries and the like via transport vehicles, pipelines, and the like. At block 20, the produced hydrocarbons may be processed according to various refining procedures to develop different products using the hydrocarbons.

It should be noted that the processes discussed with regard to the method 10 may include other suitable processes that may be based on the locations and properties of hydrocarbon deposits as indicated in the seismic data acquired via one or more seismic survey. As such, it should be understood that the processes described above are not intended to depict an exhaustive list of processes that may be performed after determining the locations and properties of hydrocarbon deposits within the subsurface region.

With the foregoing in mind, FIG. 2 is a schematic diagram of a marine survey system 22 (e.g., for use in conjunction with block 12 of FIG. 1) that may be employed to acquire seismic data (e.g., waveforms) regarding a subsurface region of the Earth in a marine environment. Generally, a marine seismic survey using the marine survey system 22 may be conducted in an ocean 24 or other body of water over a subsurface region 26 of the Earth that lies beneath a seafloor 28.

The marine survey system 22 may include a vessel 30, one or more seismic sources 32, a (seismic) streamer 34, one or more (seismic) receivers 36, and/or other equipment that may assist in acquiring seismic images representative of geological formations within a subsurface region 26 of the Earth. The vessel 30 may tow the seismic source(s) 32 (e.g., an air gun array) that may produce energy, such as sound waves (e.g., seismic waveforms), that is directed at a seafloor 28. The vessel 30 may also tow the streamer 34 having a receiver 36 (e.g., hydrophones) that may acquire seismic waveforms that represent the energy output by the seismic source(s) 32 subsequent to being reflected off of various geological formations (e.g., salt domes, faults, folds, etc.) within the subsurface region 26. Additionally, although the description of the marine survey system 22 is described with one seismic source 32 (represented in FIG. 2 as an air gun array) and one receiver 36 (represented in FIG. 2 as a set of hydrophones), it should be noted that the marine survey system 22 may include multiple seismic sources 32 and multiple receivers 36. In the same manner, although the above descriptions of the marine survey system 22 is described with one seismic streamer 34, it should be noted that the marine survey system 22 may include multiple streamers similar to streamer 34. In addition, additional vessels 30 may include additional seismic source(s) 32, streamer(s) 34, and the like to perform the operations of the marine survey system 22.

FIG. 3 is a block diagram of a land survey system 38 (e.g., for use in conjunction with block 12 of FIG. 1) that may be employed to obtain information regarding the subsurface region 26 of the Earth in a non-marine environment. The land survey system 38 may include a land-based seismic source 40 and land-based receiver 44. In some embodiments, the land survey system 38 may include multiple land-based seismic sources 40 and one or more land-based receivers 44 and 46. Indeed, for discussion purposes, the land survey system 38 includes a land-based seismic source 40 and two land-based receivers 44 and 46. The land-based seismic source 40 (e.g., seismic vibrator) that may be disposed on a surface 42 of the Earth above the subsurface region 26 of interest. The land-based seismic source 40 may produce energy (e.g., sound waves, seismic waveforms) that is directed at the subsurface region 26 of the Earth. Upon reaching various geological formations (e.g., salt domes, faults, folds) within the subsurface region 26 the energy output by the land-based seismic source 40 may be reflected off of the geological formations and acquired or recorded by one or more land-based receivers (e.g., 44 and 46).

In some embodiments, the land-based receivers 44 and 46 may be dispersed across the surface 42 of the Earth to form a grid-like pattern. As such, each land-based receiver 44 or 46 may receive a reflected seismic waveform in response to energy being directed at the subsurface region 26 via the seismic source 40. In some cases, one seismic waveform produced by the seismic source 40 may be reflected off of different geological formations and received by different receivers. For example, as shown in FIG. 3, the seismic source 40 may output energy that may be directed at the subsurface region 26 as seismic waveform 48. A first receiver 44 may receive the reflection of the seismic waveform 48 off of one geological formation and a second receiver 46 may receive the reflection of the seismic waveform 48 off of a different geological formation. As such, the first receiver 44 may receive a reflected seismic waveform 50 and the second receiver 46 may receive a reflected seismic waveform 52.

Figure 4:
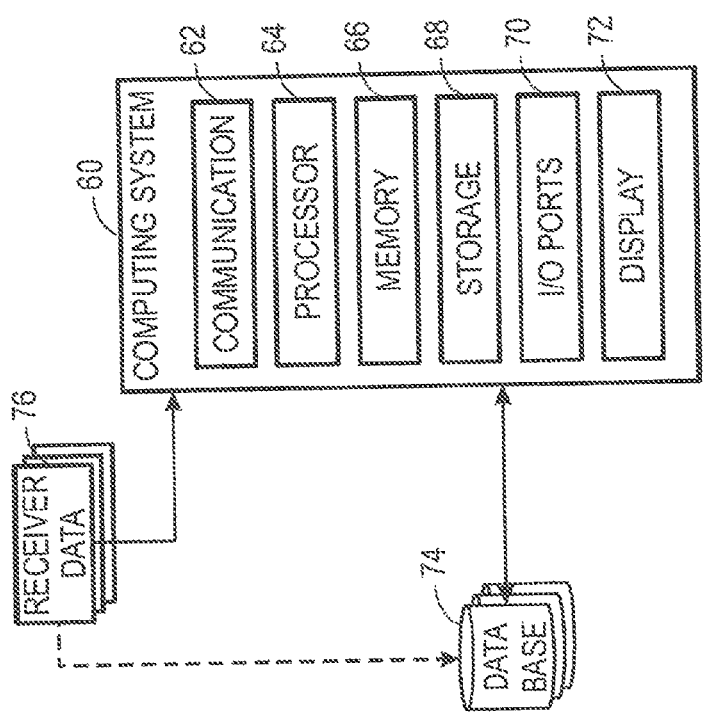
FIG. 4 illustrates a computing system that may perform operations described herein based on data acquired via the marine survey system of FIG. 2 and/or the land survey system of FIG. 3.

Regardless of how the seismic data is acquired, a computing system (e.g., for use in conjunction with block 12 of FIG. 1) may analyze the seismic waveforms acquired by the receivers 36, 44, 46 to determine seismic information regarding the geological structure, the location and property of hydrocarbon deposits, and the like within the subsurface region 26. FIG. 4 is a block diagram of an example of such a computing system 60 that may perform various data analysis operations to analyze the seismic data acquired by the receivers 36, 44, 46 to determine the structure and/or predict seismic properties of the geological formations within the subsurface region 26.

Referring now to FIG. 4, the computing system 60 may include a communication component 62, a processor 64, memory 66, storage 68, input/output (I/O) ports 70, and a display 72. In some embodiments, the computing system 60 may omit one or more of the display 72, the communication component 62, and/or the input/output (I/O) ports 70. The communication component 62 may be a wireless or wired communication component that may facilitate communication between the receivers 36, 44, 46, one or more databases 74, other computing devices, and/or other communication capable devices. In one embodiment, the computing system 60 may receive receiver data 76 (e.g., seismic data, seismograms, etc.) via a network component, the database 74, or the like. The processor 64 of the computing system 60 may analyze or process the receiver data 76 to ascertain various features regarding geological formations within the subsurface region 26 of the Earth.

The processor 64 may be any type of computer processor or microprocessor capable of executing computer-executable code. The processor 64 may also include multiple processors that may perform the operations described below. The memory 66 and the storage 68 may be any suitable articles of manufacture that can serve as media to store processor-executable code, data, or the like. These articles of manufacture may represent computer-readable media (e.g., any suitable form of memory or storage) that may store the processor-executable code used by the processor 64 to perform the presently disclosed techniques. Generally, the processor 64 may execute software applications that include programs that process seismic data acquired via receivers of a seismic survey according to the embodiments described herein.

With one or more embodiments, processor 64 can instantiate or operate in conjunction with one or more classification and/or segmentation processors. With one or more embodiments, the classification and/or segmentation processors can be linear classifiers (such as, for example, Multi-Layer Perception classifiers), support vector classifiers, and/or quadratic classifiers, for example. With another embodiment, the classification and/or segmentation processors can be implemented by using neural networks. The one or more neural networks can be software-implemented or hardware-implemented. One or more of the neural networks can be a convolutional neural network. With one or more embodiments, the classification and/or segmentation processors can perform image segmentation.

With one or more embodiments, these classification and/or segmentation processors can provide responses to different inputs. The process by which a classification and/or segmentation processor learns and responds to different inputs may be generally referred to as a "training" process.

The memory 66 and the storage 68 may also be used to store the data, analysis of the data, the software applications, and the like. The memory 66 and the storage 68 may represent non-transitory computer-readable media (e.g., any suitable form of memory or storage) that may store the processor-executable code used by the processor 64 to perform various techniques described herein. It should be noted that non-transitory merely indicates that the media is tangible and not a signal.

The I/O ports 70 may be interfaces that may couple to other peripheral components such as input devices (e.g., keyboard, mouse), sensors, input/output (I/O) modules, and the like. I/O ports 70 may enable the computing system 60 to communicate with the other devices in the marine survey system 22, the land survey system 38, or the like via the I/O ports 70.

The display 72 may depict visualizations associated with software or executable code being processed by the processor 64. In one embodiment, the display 72 may be a touch display capable of receiving inputs from a user of the computing system 60. The display 72 may also be used to view and analyze results of the analysis of the acquired seismic data to determine the geological formations within the subsurface region 26, the location and property of hydrocarbon deposits within the subsurface region 26, predictions of seismic properties associated with one or more wells in the subsurface region 26, and the like. The display 72 may be any suitable type of display, such as a liquid crystal display (LCD), plasma display, or an organic light emitting diode (OLED) display, for example. In addition to depicting the visualization described herein via the display 72, it should be noted that the computing system 60 may also depict the visualization via other tangible elements, such as paper (e.g., via printing) and the like.

With the foregoing in mind, the present techniques described herein may also be performed using a supercomputer that employs multiple computing systems 60, a cloud-computing system, or the like to distribute processes to be performed across multiple computing systems 60. In this case, each computing system 60 operating as part of a super computer may not include each component listed as part of the computing system 60. For example, each computing system 60 may not include the display 72 since multiple displays 72 may not be useful to for a supercomputer designed to continuously process seismic data.

After performing various types of seismic data processing, the computing system 60 may store the results of the analysis in one or more databases 74. The databases 74 may be communicatively coupled to a network that may transmit and receive data to and from the computing system 60 via the communication component 62. In addition, the databases 74 may store information regarding the subsurface region 26, such as previous seismograms, geological sample data, seismic images, and the like regarding the subsurface region 26.

Although the components described above have been discussed with regard to the computing system 60, it should be noted that similar components may make up the computing system 60. Moreover, the computing system 60 may also be part of the marine survey system 22 or the land survey system 38, and thus may monitor and control certain operations of the seismic sources 32 or 40, the receivers 36, 44, 46, and the like. Further, it should be noted that the listed components are provided as example components and the embodiments described herein are not to be limited to the components described with reference to FIG. 4.

In some embodiments, the computing system 60 may generate a two-dimensional representation or a three-dimensional representation of the subsurface region 26 based on the seismic data received via the receivers mentioned above. Additionally, seismic data associated with multiple source/receiver combinations may be combined to create a near continuous profile of the subsurface region 26 that can extend for some distance. In a two-dimensional (2-D) seismic survey, the receiver locations may be placed along a single line, whereas in a three-dimensional (3-D) survey the receiver locations may be distributed across the surface in a grid pattern. As such, a 2-D seismic survey may provide a cross sectional picture (vertical slice) of the Earth layers as they exist directly beneath the recording locations. A 3-D seismic survey, on the other hand, may create a data "cube" or volume that may correspond to a 3-D picture of the subsurface region 26.

In addition, a 4-D (or time-lapse) seismic survey may include seismic data acquired during a 3-D survey at multiple times. Using the different seismic images acquired at different times, the computing system 60 may compare the two images to identify changes in the subsurface region 26.

In any case, a seismic survey may be composed of a very large number of individual seismic recordings or traces. As such, the computing system 60 may be employed to analyze the acquired seismic data to obtain an image representative of the subsurface region 26 and to determine locations and properties of hydrocarbon deposits. To that end, a variety of seismic data processing algorithms may be used to remove noise from the acquired seismic data, migrate the preprocessed seismic data, identify shifts between multiple seismic images, align multiple seismic images, and the like.

After the computing system 60 analyzes the acquired seismic data, the results of the seismic data analysis (e.g., seismogram, seismic images, map of geological formations, etc.) may be used to perform various operations within the hydrocarbon exploration and production industries. For instance, as described above, the acquired seismic data may be used to perform the method 10 of FIG. 1 that details various processes that may be undertaken based on the analysis of the acquired seismic data.

In some embodiments, the results of the seismic data analysis may be generated in conjunction with a seismic processing scheme that includes seismic data collection, editing of the seismic data, initial processing of the seismic data, signal processing, conditioning, and imaging (which may, for example, include production of imaged sections or volumes (which may, for example, include production of imaged sections or volumes) in prior to any interpretation of the seismic data, any further image enhancement consistent with the exploration objectives desired, generation of attributes from the processed seismic data, reinterpretation of the seismic data as needed, and determination and/or generation of a drilling prospect or other seismic survey applications. As a result, location of hydrocarbons within a subsurface region 26 may be identified. Techniques for detecting subsurface features from the seismic data/images will be described in greater detail below.

When performing seismic data processing, it may be necessary to identify occurrences of aliasing within the seismic data. Aliasing generally refers to an effect that causes different signals to be indistinguishable from one another when these different signals are sampled. Further, if a representation of the signal data is constructed based on sampled signals that differ from the actual signals, then the construction based on the sampled data will be different from the actual representation. After the presence of aliasing is identified within a representation of seismic data, then the aliasing can then be removed. Identification and removal of aliasing can be particularly important when performing interpolation upon processed seismic data.

Interpolation generally refers to a process of determining/inferring new portions/points of data based on a set of known data. In the context of seismic data processing, interpolation generally refers to a process of determining a new portion of seismic data based on an existing portion of seismic data. When performing interpolation of seismic data, identification and/or removal of occurrences of aliasing from the existing portion of seismic data can be important because the presence of aliasing in the existing portion of seismic data can cause the newly determined portion of seismic data to include erroneous data. In general, most algorithms that perform interpolation do not perform well when they are applied to aliased seismic data.

In view of the above-described technical difficulties that are caused by occurrences of aliasing within seismic data (where the seismic data is to undergo processing), one or more embodiments of the present invention are directed to a method and apparatus that identifies and/or removes aliasing by using deep learning algorithms. Specifically, one or more embodiments of the present invention can perform de-aliasing. Computer-based algorithms generally encounter difficulty when attempting to identify and to remove aliasing. One or more embodiments of the present invention can be used to improve methods of performing interpolation, such as methods of projecting onto convex sets (POCS) and methods that use Anti-Leakage Fourier Transforms.

In order to identify and/or remove aliasing from seismic data, one or more embodiments can perform one or more of the following method steps. The method can include performing modelling of a subsurface region to generate corresponding seismic data. Modelling generally refers to the generation of a simulated subsurface region, and representing the simulated subsurface region using corresponding simulated seismic data. In the course of performing modelling, the method can generate both: (1) simulated seismic data which does not include aliasing, and (2) simulated seismic data that does include aliasing. Although modelled seismic data is specifically described below, other embodiments of the present invention can be applicable to any other type of data from which aliasing is to be removed.

Once the above-described simulated seismic data is generated, the method can project the generated seismic data into another domain in order to perform signal analysis, as described in more detail below. Specifically, one or more embodiments can project the generated seismic data into the Fourier domain, for example. Although the Fourier domain is specifically described herein, other embodiments can project the data onto other domains via other transforms, such as by performing a wavelet transform, a seislet domain, an Abel transform, a Bateman transform, a Gabor transform, a Laplace transform, a Jacobi transform, and/or any other types of transforms.

Once unaliased seismic data and aliased seismic data (along with their corresponding representations in the Fourier domain) are generated, one or more embodiments can train a computer system to identify characteristics of aliasing within the data by analyzing the generated aliased data and the generated unaliased data. An identifiable characteristics of aliasing can generally be referred to as a "signature" of aliasing, or an "aliased signature." As such, one or more embodiments can train a classification and/or segmentation processor to analyze aliased data and unaliased data in order to isolate an aliased signature. The one or more embodiments can also analyze the corresponding transformations of the aliased data and the unaliased data to isolate an aliased signature that appears in the Fourier domain.

With one or more embodiments, the classification and/or segmentation processor that is to be trained can be a computer system that implements a deep-learning algorithm. As such, the method of one or more embodiments can train an implemented deep-learning algorithm to identify aliased signatures, where one or more aliased signatures can appear in the Fourier domain, for example. With one or more embodiments, the implemented deep-learning algorithm can be a multilayer perception algorithm. Although multilayer perception algorithms are specifically mentioned, other embodiments can use other implemented deep-learning algorithms.

During the process of training a classification and/or segmentation processor, the classification and/or segmentation processor can be trained by analyzing labelled instances of seismic data. The aliased data (and corresponding transform) can be labelled as "aliased," while the unaliased data (and the corresponding transform) can be labelled as "unaliased." Both the instances of aliased data and the instances of unaliased data can thus be input into the deep-learning system to complete the training process.

As discussed above, the deep-learning system can be trained using simulated sets of aliased data and unaliased data. Simulated data can generally be referred to as synthetic data. After the deep-learning system has been trained to identify aliased signatures (and has thus been trained to identify the occurrence of aliasing within seismic data), one or more embodiments can then use the trained deep-learning system to identify occurrences of aliasing in actual seismic data that needs to be analyzed (as opposed to merely analyzing the above-mentioned simulated seismic data). The actual seismic data can be seismic data from which aliasing is to be identified, and from which the identified aliasing is to be removed. Similar to the process that is applied to the above-described modelled/simulated data, the method of one or more embodiment can also project the actual seismic data into the Fourier domain.

One or more embodiments can then input the actual seismic data (and its corresponding transformation) into the trained deep-learning system. The system can then identify aliased signatures within the actual seismic data, and the system can then remove occurrences of aliasing that correspond to the identified aliased signatures from the actual seismic data.

One or more embodiments can identify and remove occurrences of aliasing from the transformed seismic data (i.e., the aliasing can be removed from the seismic data as represented in the Fourier domain). After the aliasing is removed, the method of one or more embodiments can then perform an inverse Fourier transform upon the transformed seismic data. By performing the inverse Fourier transform, one or more embodiments of the present invention can convert the transformed seismic data from the Fourier domain back into the time domain.

Figure 5:
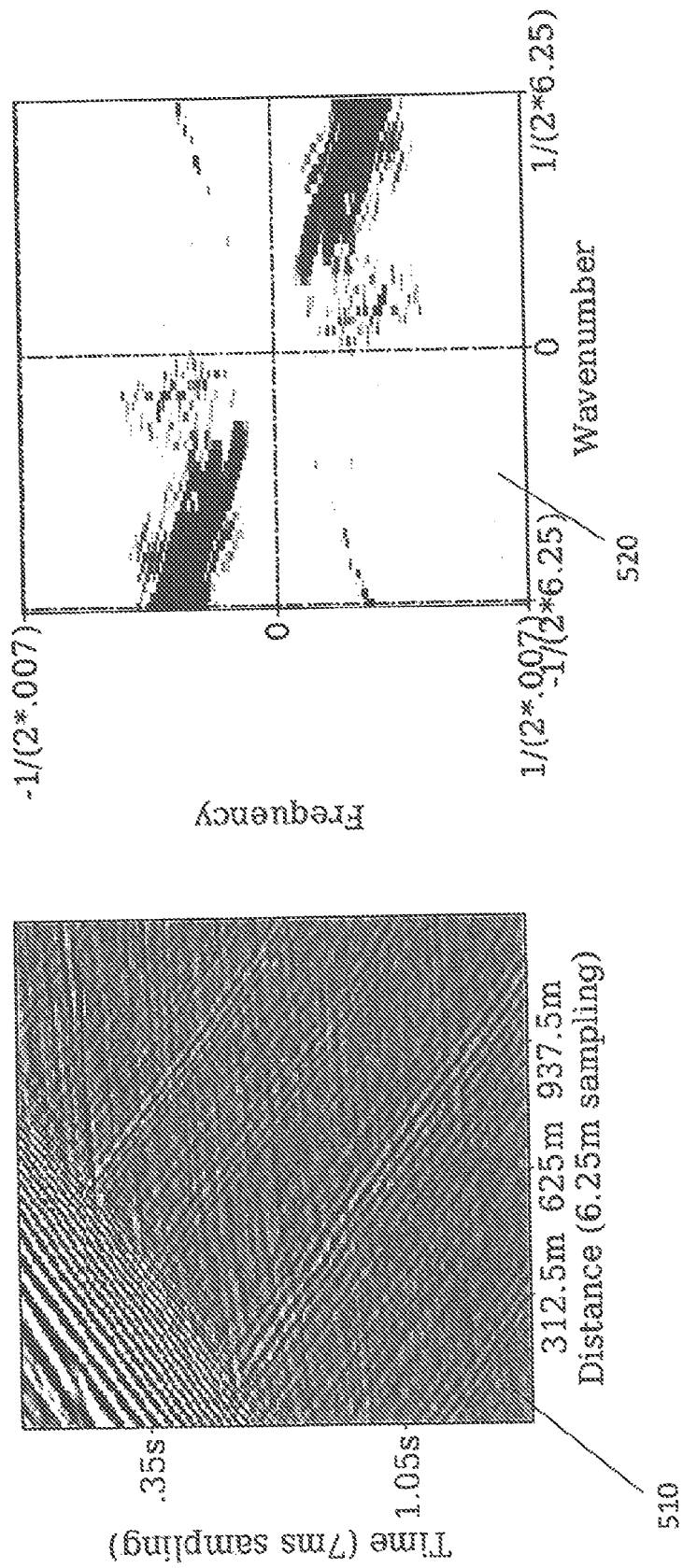
FIG. 5 illustrates representations of seismic data, where the seismic data does not include aliasing.

As previously described above, one or more embodiments can initially train the classification and/or segmentation processor using modelled seismic data. FIG. 5 illustrates representations of modelled seismic data, where the modelled seismic data does not include the presence of aliasing. Representation 510 can be modelled seismic data that is expressed in terms of time and distance. One or more embodiments can perform a transformation in order to transform the modelled seismic data into a different domain. For example, one or more embodiments of the present invention can perform a Fourier transform on the seismic data of representation 510, in order to transform the seismic data into the Fourier domain. Representation 520 illustrates the seismic data as represented in the Fourier domain, where the seismic data is expressed in terms of frequency and wavenumber. Representation 510 and 520 can be examples of modelled data that does not include aliasing.

Figure 6:
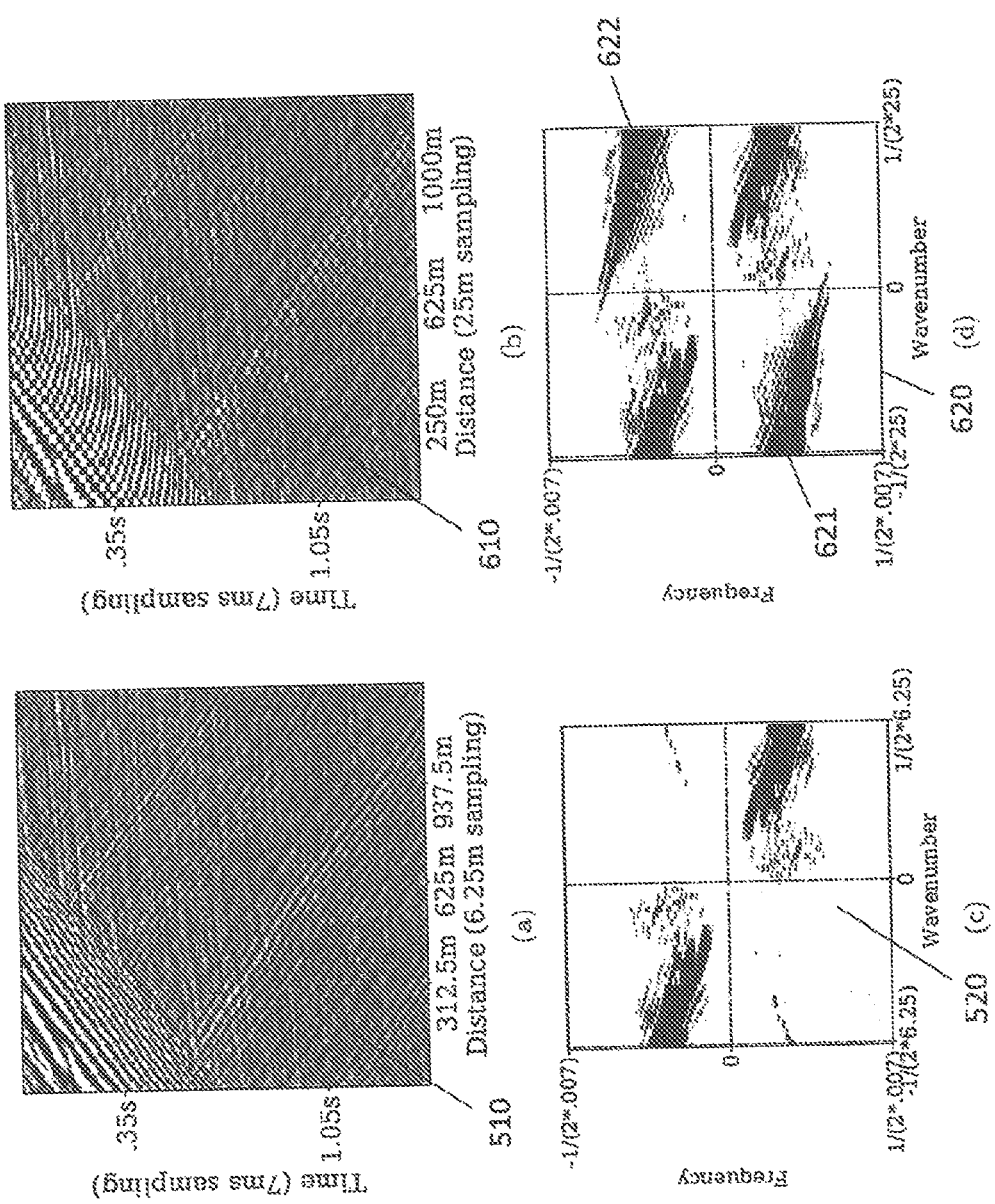
FIG. 6 illustrates a comparison between representations of unaliased seismic data and representations of aliased seismic data.

FIG. 6 illustrates a comparison between representations of unaliased seismic data and representations of aliased seismic data. As described above, representation 510 is a representation of unaliased seismic data, as expressed in terms of time and distance. Representation 520 is a representation of the same unaliased seismic data, as represented within the Fourier domain, as expressed in terms of frequency and wavenumber. As described above, one or more embodiments can generate modelled data, where the modelled data includes the presence of aliasing. Specifically, one or more embodiments can perform a method of decimation upon the unaliased seismic data in order to generate aliased seismic data. Representation 610 is a representation of aliased seismic data, as expressed in terms of time and distance. Representation 610 is an aliased representation of the unaliased data of representation 510. As shown in the upper-left portion of representation 610, representation 610 includes a step pattern, which is generally indicative of the presence of aliasing. Representation 620 is a representation of the same aliased seismic data, as represented within the Fourier domain, as expressed in terms of frequency and wavenumber. Comparing Fourier representation 520 and Fourier representation 620, the bottom-left portion 621 and upper-right portion 622 of Fourier representation 620 indicates the presence of aliasing.

As described above, one or more embodiments can train a classification and/or segmentation processor using labelled inputs. The classification and/or segmentation processor can be trained with modelled (simulated) seismic data and/or actual seismic data. One or more embodiments can label the representations of aliased data and the representations of unaliased data, and one or more embodiments can input the labelled representations into the classification and/or segmentation processor, in order to facilitate the training of the classification and/or segmentation processor. Seismic data that has been projected into a transform domain can also be labelled and input into the classification and/or segmentation processor. As such, the classification and/or segmentation processor can identify the presence of aliasing by using deep learning.

The classification and/or segmentation processor can be a Multi-Layer Perceptron (MLP) classifier. Although one or more embodiments can use a MLP classifier, other embodiments can use other types of classifiers such as, for example, other linear classifiers, support vector classifiers, quadratic classifiers. The classification and/or segmentation processor can also be implemented using convolutional neural networks (CNNs), and/or recurrent neural networks (RNNs), etc. The classification and/or segmentation processor can be trained to identify the presence of aliasing within the representation of transformed data. As such, in the case where the aliased data has been transformed into the Fourier domain, the classification and/or segmentation processor can be trained to classify/identify portions of seismic data (within the frequency-wavenumber spectra) that are aliased.

In order to classify/identify occurrences of aliasing within the seismic data by the trained classification and/or segmentation processor, the trained classification and/or segmentation processor of one or more embodiments can generate interpretable binary outputs in response to inputted seismic data. With respect to labelling the seismic data that is used to train the classification and/or segmentation processor, a label of "1" can be applied to data that includes aliasing, while a label of "0" can be applied to data that does not include aliasing. As discussed above, seismic data that is projected into a transform domain can be used to train the classification and/or segmentation processor. In one example, when aliasing exists in the Fourier transform of inputted data $Xf(i,j)$, the trained classification and/or segmentation processor can generate a binary output that corresponds to $y(i,j)=1$. When aliasing does not exist in the Fourier transform of inputted data $Xf(i,j)$, the trained classification and/or segmentation processor can generate a binary output that corresponds to $y(i,j)=0$. Further, the trained classification and/or segmentation processor of one or more embodiments can also be configured to generate more sophisticated outputs such as $y(i,j)=p$, where $0 \leq p \leq 1$, and where p represents a probability of the presence of aliasing. By analyzing the labelled inputs, the system of one or more embodiments can be trained to identify the presence of aliasing within seismic data represented within, for example, the Fourier domain. As described above, other embodiments can be trained to identify the presence of aliasing within other domains, such as, for example, a wavelet domain and/or a seislet domain.

After the trained classification and/or segmentation processor is trained to identify the presence of aliasing, one or more embodiments can isolate these portions of seismic data which contain aliasing. For example, the classification and/or segmentation processor of one or more embodiments can generate a mask based on the identified aliased portions, and this mask can be used to remove the aliased energy.

Figure 7:
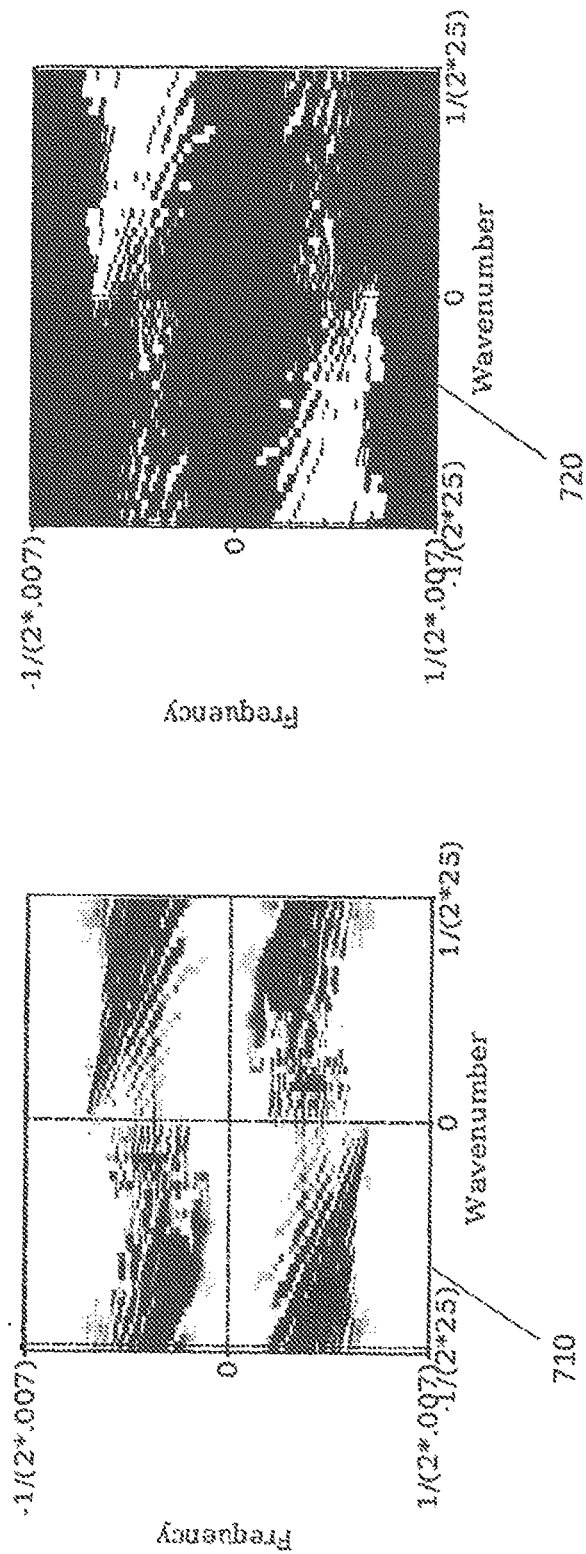
FIG. 7 illustrates a representation of aliased data in the Fourier domain, along with a corresponding mask, in accordance with one or more embodiments of the present invention.

FIG. 7 illustrates a representation of aliased data in the Fourier domain, along with a corresponding mask, in accordance with one or more embodiments of the present invention. As described above, after the classification and/or segmentation processor has identified/isolated the portions of aliased data, the classification and/or segmentation processor can generate a mask based on the identified/isolated portions of aliased data. This mask can then be applied onto the aliased data in order to remove the aliased data. Representation 710 is a representation of aliased seismic data (in the Fourier domain), where large amounts of aliasing occur in the upper-right and lower-left portions of the representation. Mask 720 corresponds to a mask, where the mask (indicated by the white) is intended to mask the aliasing that occurs in the upper-right and lower-left portions of representation 710.

As described above, the mask can be applied to the transformed aliased data. After the mask is applied to the transformed aliased data, the mask will generally remove the aliasing from the transformed aliased data, as described in more detail below. With one or more embodiments of the present invention, the mask can include one or more values to be applied upon the transformed aliased data. Each value of the mask can be associated with a portion of the transformed aliased data, and each value indicates whether aliasing has been identified at the corresponding portion of transformed aliased data. In one example embodiment, the mask can include binary values of "1" and "0," where the value of "1" is assigned when aliasing has been identified at the corresponding portion of transformed aliased data, and where the value of "0" is assigned when aliasing has not been identified at the corresponding portion of transformed aliased data. Although the binary values of "1" and "0" are specifically mentioned above, other embodiments can use other example values to indicate the presence of aliasing.

With the above-described example mask, which includes binary values of "1" and "0," one or more embodiments can apply the mask onto the transformed aliased data by removing portions of transformed aliased data that are associated with the binary value of "1," while not removing portions of the transformed aliased data that are associated with the binary value of "0." As such, one or more embodiments can apply the mask upon the transformed aliased data in order to effectively remove aliasing from the transformed aliased data.

After the aliasing is removed from the transformed aliased data, one or more embodiments can then perform an inverse transform to express the transformed data (with aliasing now removed) into the time domain. For example, in the event that aliasing is removed from Fourier-transformed aliased data, one or more embodiments can then perform an inverse Fourier transform to express the seismic data within the time domain. Therefore, the seismic data will then be expressed within the time domain, where the aliasing has been largely removed from the data which is expressed in the time domain as well.

In view of the above, one or more embodiments can use a mask to remove aliasing from seismic data that has been projected into a transform domain. After aliasing is removed from seismic data that has been projected into the transform domain, one or more embodiment can perform an inverse transform to project the seismic data into the time domain. Because the aliasing was earlier removed from the seismic data, the seismic data (that is expressed in the time domain) will now generally be de-aliased.

In addition to the above-described benefits, one or more embodiments can also be directed to a method of refining sampling and modifying an effective Nyquist frequency. Specifically, one or more embodiments of the present invention can effectively extend the Nyquist Frequency. Aliasing can occur when the seismic data is intended to represent seismic signals which exceed the Nyquist frequency. Specifically, aliasing can occur when seismic signals exceed the Nyquist frequency, because these signals are reconstructed using signals that are less than the Nyquist frequency, as described in more detail below.

If seismic data is known to contain aliased data, and if a signal frequency of the aliased data can be determined, then the actual frequency of the aliased data can be determined based on the following mathematical relationship: $f_{alias} = f_{Nyq} - |F_{actual} - f_{Nyq}|$ Therefore, because one or more embodiments can determine which portions of the seismic data include aliasing, and because the frequency of the aliased data can be determined, then the actual frequency of the aliased data can also be determined by one or more embodiments of the present invention.

As described above, aliasing can occur when seismic signals exceed the Nyquist frequency, because these signals are reconstructed using signals that are less than the Nyquist frequency. As such, the seismic data (which includes both aliased data and unaliased data) is initially represented within a frequency range which ranges from 0 to the Nyquist frequency ($f_{Nyq}$). Because some seismic signals may be outside of this narrow frequency range, these seismic signals are thus misrepresented within the representation of seismic data, and thus aliasing occurs.

With one or more embodiments, the seismic data can now be represented within a wider frequency band such as, for example, 0 to $2f_{Nyq}$. One or more embodiments can represent the seismic data within the wider frequency band by re-positioning the aliased data to its correct position in the transformed domain (such as, for example, the frequency-wavenumber space) as opposed to leaving the aliased data at its initial aliased position, as described in more detail below. As such, one or more embodiments of the present invention can correctly represent the seismic data by effectively increasing the sampling rate. As such, one or more embodiments can more accurately represent the seismic data by effectively doubling the sampling rate. Although the embodiment of the above example effectively doubled the Nyquist frequency, other embodiments can effectively increase this frequency by any other desired amount/increment.

One or more embodiments of the present invention can reconstruct seismic data represented within the transform domain (such as, for example, within the frequency-wavenumber domain), where the frequency bandwidth is greater than the Nyquist frequency. Portions of the seismic data that were identified (by the classification algorithm) as being unaliased can be left alone. These unmodified portions of seismic data can be presented accurately by being directly presented. On the other hand, the portions of seismic data that were identified as being aliased can be represented within an extended spectra.

Figure 8:
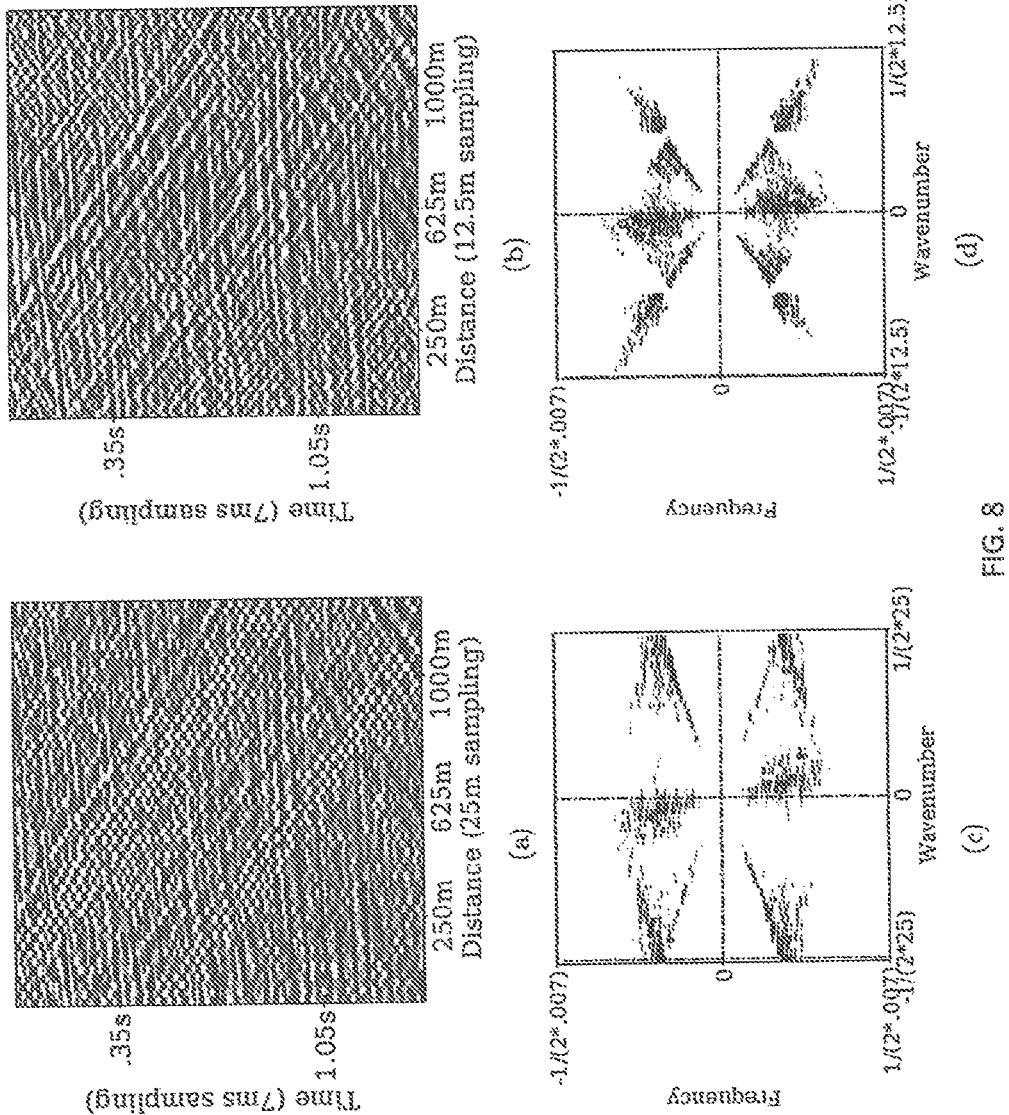
FIG. 8 illustrates a representation of reconstructed data after extending an effective Nyquist frequency, in accordance with one or more embodiments.

FIG. 8 illustrates a representation of reconstructed data after extending an effective Nyquist frequency, in accordance with one or more embodiments. Specifically, FIG. 8 illustrates an example where the Nyquist frequency ($f_{Nyq}$) is effectively doubled. FIG. 8(a) illustrates a representation of seismic data that includes aliasing. FIG. 8(c) illustrates a Fourier transform of the same seismic data that includes aliasing. FIG. 8(b) illustrates a representation of a reconstruction of the same seismic data, where $f_{Nyq}$ has been effectively increased. As such, aliasing has generally been removed from the seismic data of FIG. 8(b). FIG. 8(d) illustrates a Fourier transform of the seismic data of FIG. 8(b), where $f_{Nyq}$ has been effectively increased, which thus removes occurrences of aliasing.

Figure 9:
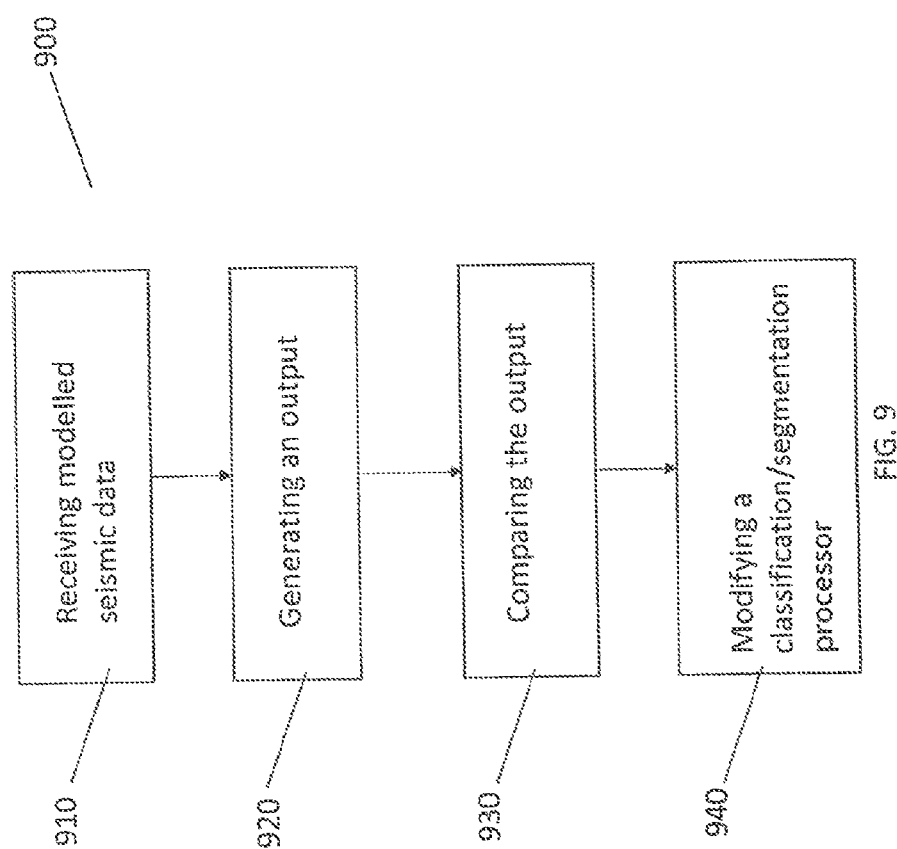
FIG. 9 illustrates a flow chart of a method of one or more embodiments.

FIG. 9 illustrates a flow chart of a method 900 that implements a method of one or more embodiments. The method of one or more embodiments can be performed by the computing system of FIG. 4, for example.

The method, at 910, can include receiving modelled seismic data that is to be recognized by at least one classification and/or segmentation processor. The modelled seismic data can be represented within a transform domain. The method, at 920, includes generating an output via the at least one classification and/or segmentation processor based on the received modelled seismic data. The method, at 930, can include comparing the output of the at least one classification and/or segmentation processor with a desired output. The method, at 940, can also include modifying the at least one classification and/or segmentation processor so that the output of the classification and/or segmentation processor corresponds to the desired output.

Figure 10:
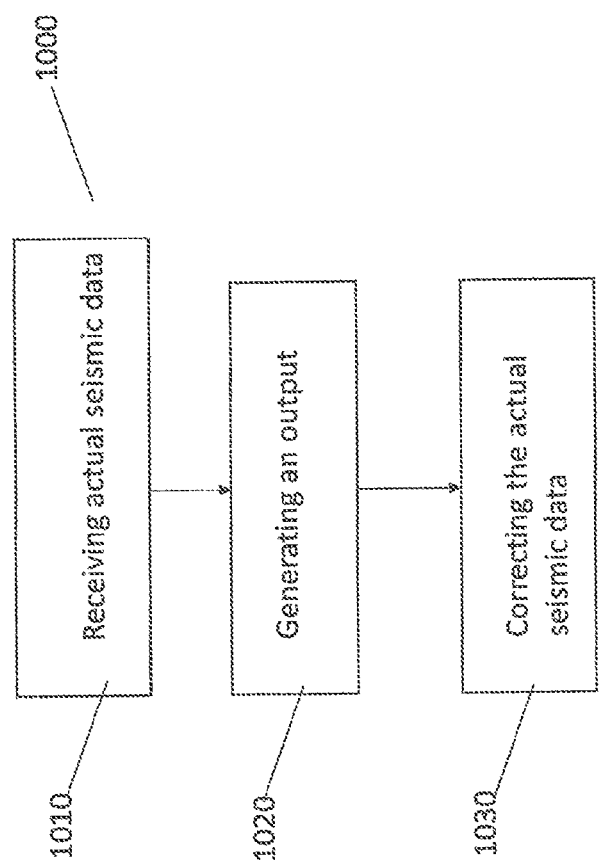
FIG. 10 illustrates a flow chart of a method of one or more embodiments.

FIG. 10 illustrates a flow chart of a method 1000 that implements a method of one or more embodiments. The method of one or more embodiments can be performed by the computing system of FIG. 4, for example.

The method, at 1010, includes receiving actual seismic data. The received actual seismic data includes aliasing that is to be identified by at least one classification and/or segmentation processor. The received actual seismic data comprises data represented within a transform domain. The method also includes, at 1020, generating an output via the at least one classification and/or segmentation processor based on the received seismic data. The method, at 1030, includes correcting the actual seismic data for the aliasing based on the output.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A non-transitory computer readable medium comprising instructions, which implements or operates in conjunction with at least one classification and segmentation processor, and which causes a processor of a computer to:
   receive, by the at least one classification and segmentation processor, modelled seismic data including modelled aliased data and modelled unaliased data, wherein the modelled seismic data is based on data received from a receiver comprising a sensor device in a seismic survey;
   train the at least one classification and segmentation processor to identify characteristics of the modelled aliased data in the modelled seismic data;
   receive actual seismic data after training the at least one classification and segmentation processor, wherein the actual seismic data includes aliasing, wherein the actual seismic data is representative of a subsurface region of Earth, and wherein the actual seismic data is represented within the transform domain;
   identify, using the trained at least one classification and segmentation processor, aliased data in the actual seismic data; and
   correct the actual seismic data for the aliasing by performing at least one:
      remove the aliased data from the actual seismic data using a mask; or
      reposition a position of the aliased data in the transform domain,
   determine locations and properties of hydrocarbon deposits to drill into the subsurface region of the Earth based on the actual seismic data that has been corrected for aliasing.

2. The non-transitory computer readable medium of claim 1, wherein the instructions further cause the computer to project the modelled seismic data into the Fourier domain.

3. The non-transitory computer readable medium of claim 1, wherein the at least one classification and segmentation processor is implemented by at least one of a multi-layer perceptron or a neural network.

4. The non-transitory computer readable medium of claim 1, wherein, to train the at least one classification and segmentation processor to identify characteristics of the modelled aliased data, the instructions further cause the computer to:
  label the modeled aliased data as aliased; and
  label the aliased data as aliased.

5. The non-transitory computer readable medium of claim 1, wherein the instructions further cause the computer to perform an inverse Fourier transform on the actual seismic data after correcting the actual seismic data for the aliasing.

6. The non-transitory computer readable medium of claim 5, wherein the received modelled data is decimated modelled data, and aliasing is introduced into the modelled data after the decimating.

7. A computer-implemented method comprising:
  receiving, by at least one classification and segmentation processor, modelled seismic data including modelled aliased data and modelled unaliased data, wherein the modelled seismic data is based on data received from a receiver comprising a sensor device in a seismic survey;
  training the at least one classification and segmentation processor to identify characteristics of the modelled aliased data in the modelled seismic data;
  receiving actual seismic data after training the at least one classification and segmentation processor, wherein the actual seismic data includes aliasing, wherein the actual seismic data is representative of a subsurface region of Earth, and wherein the actual seismic data is represented within the transform domain;
  identifying, using the trained at least one classification and segmentation processor, aliased data in the actual seismic data; and
  correcting the actual seismic data for the aliasing by performing at least one:
    removing the aliased data from the actual seismic data using a mask; or
    repositioning a position of the aliased data in the transform domain,
  determining locations and properties of hydrocarbon deposits to drill into the subsurface region of the Earth based on the actual seismic data that has been corrected for aliasing.

8. The method of claim 7, further comprising projecting the modelled seismic data into the Fourier domain.

9. The method of claim 7, wherein the at least one classification and segmentation processor is implemented by a multi-layer perceptron and a neural network.

10. The method of claim 7, wherein training the at least one classification and segmentation processor to identify the characteristics of the modelled aliased data in the modelled seismic data comprises:
  labelling the modeled aliased data as aliased; and
  labelling the aliased data as aliased.

11. The method of claim 7, further comprising performing an inverse Fourier transform on the actual seismic data after correcting the actual seismic data for the aliasing.

12. The method of claim 11, wherein the received modelled data is decimated modelled data, and aliasing is introduced into the modelled data after the decimating.

13. A non-transitory computer readable medium comprising instructions, which implements or operates in conjunction with at least one classification and segmentation processor, and which causes a processor of a computer to:
  receive, by the at least one classification and segmentation processor, modelled seismic data including modelled aliased data and modelled unaliased data, wherein the modelled seismic data is based on data received from a receiver comprising a sensor device in a seismic survey;
  train the at least one classification and segmentation processor to identify characteristics of the modelled aliased data in the modelled seismic data;
  receive actual seismic data representative of a subsurface region of Earth, wherein the received actual seismic data includes aliasing that is to be identified by the at least one classification and segmentation processor, and wherein the received actual seismic data comprises data represented within a transform domain;
  generate an output via the at least one classification and segmentation processor based on the received actual seismic data;
  generate a mask based on the output; and
  remote aliasing from the received actual seismic data using the generated mask,
  determine locations and properties of hydrocarbon deposits to drill into the subsurface region of the Earth based on the actual seismic data that has been corrected for aliasing.

14. The non-transitory computer readable medium of claim 13, wherein the actual seismic data is represented within the Fourier domain.

15. The non-transitory computer readable medium of claim 13, wherein the at least one classification and segmentation processor comprises a multi-layer perceptron and a neural network.

16. The non-transitory computer readable medium of claim 13, wherein the generated output comprises an identification of aliased data.

17. A computer-implemented method comprising:
  receiving, by at least one classification and segmentation processor, modelled seismic data including modelled aliased data and modelled unaliased data, wherein the modelled seismic data is based on data received from a receiver comprising a sensor device in a seismic survey;
  training the at least one classification and segmentation processor to identify characteristics of the modelled aliased data in the modelled seismic data;
  receiving actual seismic data representative of a subsurface region of Earth, wherein the received actual seismic data includes aliasing that is to be identified by at least one classification and segmentation processor, and wherein the received actual seismic data comprises data represented within a transform domain;
  generating an output via the at least one classification and segmentation processor based on the received actual seismic data; and
  correcting the actual seismic data for the aliasing based on the output,
  determining locations and properties of hydrocarbon deposits to drill into the subsurface region of the Earth based on the actual seismic data that has been corrected for aliasing.

18. The method of claim 17, wherein the actual seismic data is represented within the Fourier domain.

19. The method of claim 17, wherein the at least one classification and segmentation processor comprises a multi-layer perceptron and a neural network.

20. The method of claim 17, wherein the generated output comprises an identification of aliased data.

* * * * *